(12) United States Patent
Niehues et al.

(10) Patent No.: US 9,290,110 B2
(45) Date of Patent: Mar. 22, 2016

(54) ADJUSTING DEVICE, IN PARTICULAR FOR A VEHICLE SEAT

(75) Inventors: Andreas Niehues, Langenfeld (DE); Marian Hudcovsky, Slavnica (SK)

(73) Assignee: JOHNSON CONTROLS GMBH, Burscheid (DE)

( * ) Notice: Subject to any disclaimer, the term of this patent is extended or adjusted under 35 U.S.C. 154(b) by 36 days.

(21) Appl. No.: 13/818,974

(22) PCT Filed: Aug. 24, 2011

(86) PCT No.: PCT/EP2011/064572
§ 371 (c)(1),
(2), (4) Date: Apr. 17, 2013

(87) PCT Pub. No.: WO2012/025570
PCT Pub. Date: Mar. 1, 2012

(65) Prior Publication Data
US 2014/0145053 A1    May 29, 2014

(30) Foreign Application Priority Data
Aug. 26, 2010   (DE) .......................... 10 2010 035 430

(51) Int. Cl.
*F16M 13/00* (2006.01)
*B60N 2/07* (2006.01)
*B60N 2/06* (2006.01)
(Continued)

(52) U.S. Cl.
CPC ................ *B60N 2/0722* (2013.01); *B60N 2/06* (2013.01); *B60N 2/085* (2013.01); *B60N 2/0818* (2013.01); *B60N 2/0825* (2013.01); *B60N 2/0881* (2013.01); *B60N 2205/20* (2013.01)

(58) Field of Classification Search
CPC .................. B64D 11/0696; B64D 2011/0644; B60N 2/0705; B60N 2/0715; B60N 2/0818; B60N 2/0825; B60N 2/0881; B60N 2/07; B60N 2/0727; B60N 2/06; B60N 2/0722; B60N 2205/20; F16M 11/04; F16M 11/10; F16M 13/022; F16M 2200/022; F16M 2200/025; F16M 11/18
USPC .............................. 248/298.1, 214, 424, 429
See application file for complete search history.

(56) References Cited

U.S. PATENT DOCUMENTS 3,672,625 A   6/1972   Cazabon et al.
4,725,032 A   2/1988   Kazaoka et al.
(Continued)

FOREIGN PATENT DOCUMENTS

CN        1550372 A     12/2004
CN        201272262 Y    7/2009
(Continued)

OTHER PUBLICATIONS

German office action received in related German Application No. 10 2010 035 430.9; dtd Jan. 24, 2012.
(Continued)

*Primary Examiner* — Syed A Islam
*Assistant Examiner* — Taylor Morris
(74) *Attorney, Agent, or Firm* — Foley & Lardner LLP

(57) ABSTRACT

An adjusting device for a vehicle seat includes a guide element for guiding a lever element. The guide element is in contact with a carrier rail. At least one contact region of the guide element includes a profiled chamfer in at least some sections.

4 Claims, 1 Drawing Sheet

(51) Int. Cl.
*B60N 2/08* (2006.01)
*F16L 3/08* (2006.01)
*B60N 2/02* (2006.01)
*A47B 97/00* (2006.01)
*A47C 31/00* (2006.01)

(56) References Cited

U.S. PATENT DOCUMENTS

| | | | | |
|---|---|---|---|---|
| 5,024,120 | A * | 6/1991 | Andra | 74/574.4 |
| 5,205,374 | A * | 4/1993 | Love et al. | 180/300 |
| 6,640,380 | B2 * | 11/2003 | Rosenstein et al. | 15/250.32 |
| 6,648,394 | B2 * | 11/2003 | Lejeune et al. | 296/65.13 |
| 6,761,407 | B1 * | 7/2004 | Goodbred | 297/344.1 |
| 7,628,441 | B2 * | 12/2009 | Quast | 296/65.13 |
| 2002/0179798 | A1 * | 12/2002 | Fuller | 248/429 |
| 2004/0217251 | A1 * | 11/2004 | Leguede et al. | 248/424 |
| 2008/0251679 | A1 * | 10/2008 | Stoia et al. | 248/429 |
| 2009/0212190 | A1 * | 8/2009 | Dahlbacka et al. | 248/429 |
| 2010/0140438 | A1 * | 6/2010 | Semenchenko | 248/429 |

FOREIGN PATENT DOCUMENTS

| | | |
|---|---|---|
| DE | 36 31 810 A1 | 2/1987 |
| DE | 37 44 234 A1 | 7/1989 |
| DE | 38 29 218 C1 | 4/1990 |
| DE | 40 07 857 A1 | 9/1991 |
| DE | 100 39 511 A1 | 2/2002 |
| DE | 203 13 952 U1 | 1/2005 |
| DE | 1020060 39 505 A1 | 2/2008 |
| EP | 0 944 38 B1 | 11/1983 |
| EP | 0 260 074 A2 | 3/1988 |
| JP | 2002-174307 A | 6/2002 |
| WO | WO-2008/018435 A1 | 2/2008 |
| WO | WO-2010/080597 A1 | 7/2010 |

OTHER PUBLICATIONS

International Search Report received in connection with international application No. PCT/EP2011/064572; dtd Oct. 24, 2011.
Office Action recieved in Japanese Application No. 2013-522270 dated Feb. 25, 2014. (with Translation).
Office Action dated Dec. 1, 2014, in corresponding Chinese Application No. 201180041301.3, 7 pages.

* cited by examiner

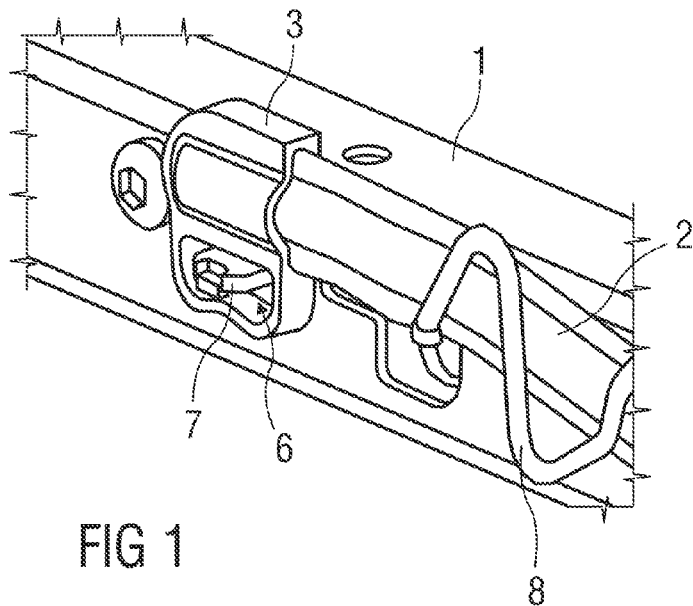
FIG 1
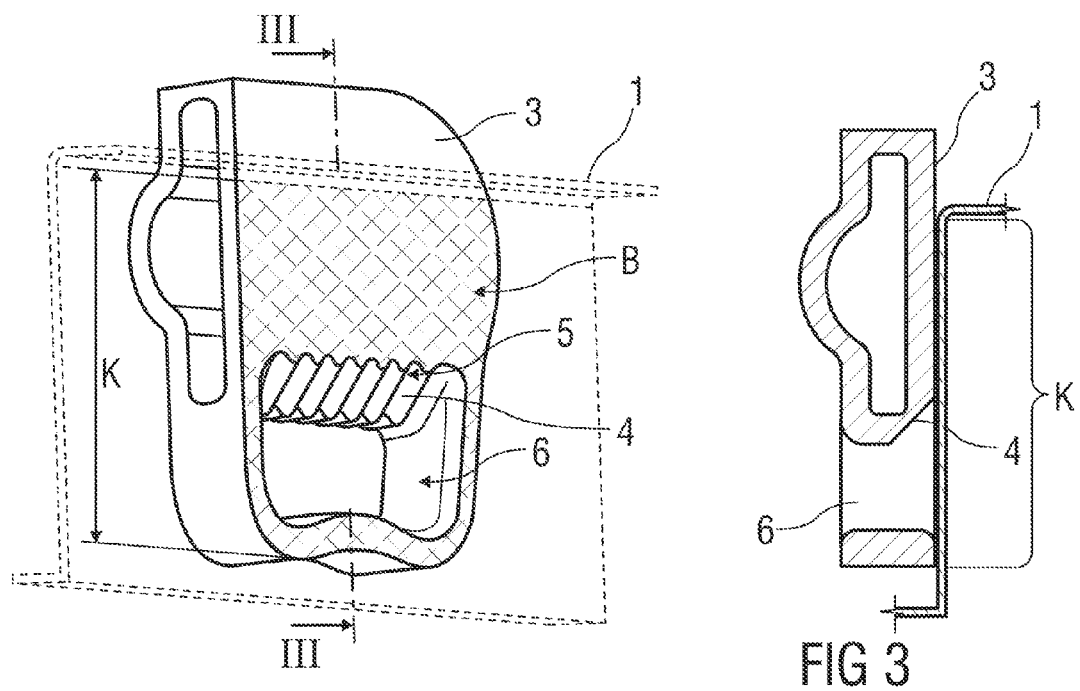
FIG 2
FIG 3

ADJUSTING DEVICE, IN PARTICULAR FOR A VEHICLE SEAT

CROSS REFERENCE TO RELATED APPLICATIONS

The present application is a National Stage of International Application No. PCT/EP2011/064572 filed on Aug. 24, 2011, which claims the benefit of German Patent Application No. 10 2010 035 430.9 filed on Aug. 26, 2010, the entire disclosures of which are incorporated herein by reference.

The invention relates to an adjusting device, in particular for vehicle seats, comprising a guide element for guiding a lever element, wherein the guide element is in positive contact with a carrier rail. The invention further relates to a vehicle seat comprising such an adjusting device and a method for producing a vehicle seat.

Vehicle seats generally comprise a longitudinal adjustment mechanism to be operated manually or electrically, and which fixes the seat by means of recesses and associated locking elements on interlocking rail pairs, in each case arranged in parallel. In this case, the rail pairs may have an open or closed profile (for example DE 3631810A, DE 4007857A, EP A2-0260074) and, on the one hand, are fixed to the vehicle seat and, on the other hand, to the vehicle floor and/or a base plate.

Frequently, with such types of adjusting mechanisms, levers or guide elements are displaceably guided in carrier rails and fixed so as to be able to be locked in position in a variable manner. This may result in undesirable noise development, in particular during the unlocking process.

It is the object of the present invention to specify an adjusting device for a vehicle seat with improved properties with regard to the quietest possible operation, in particular during an adjustment process, for example when adjusting the longitudinal alignment of a vehicle seat. A vehicle seat with an improved adjusting device is also to be specified.

This object is achieved according to the invention by the features described herein. With regard to the vehicle seat, the object is achieved by the feature also described further herein.

Advantageous developments of the invention are described further herein.

The adjusting device comprises a guide element in positive contact with a carrier rail for guiding a lever element. According to the invention, at least one contact region of the guide element at least partially comprises a profiled chamfer.

"Lever element" is understood within the meaning of the invention as a rod, rail or similar component which is rotatably arranged on the carrier rail and on at least one end engages in the guide element.

The adjusting device according to the invention not only saves material during manufacture by reducing the bearing surface on the carrier rail, but also permits particularly simple unlocking due to the associated reduction of frictional resistance, for the adjustment, for example, of the vehicle seat, with at the same time considerably reduced noise development.

The profiled chamfer on the guide element also results in a greater manufacturing tolerance for the component to be guided of the adjusting device according to the invention, without the device here losing the aforementioned advantageous properties.

In a development of the invention, the profiled chamfer is provided with a wave-shaped profile. Such a chamfer profiled in a wave-shaped manner is able to be produced in a simple manner and serves for the further reduction of the bearing surface between the guide element and the carrier rail. For example, the guide element may be designed as a molded part into which the wave-shaped profile is molded.

Expediently, the chamfered and profiled contact region is formed on a side of the guide element facing the carrier rail. One possible embodiment provides that the contact region is formed on an edge of a recess of the guide element.

In a preferred embodiment of the invention, the guide element is manufactured from materials and/or is coated with materials which belong to the group of thermoplastic elastomers, in particular those which are selected from the group consisting of copolyester elastomers (COPE) (for example Arnitel™ (DSM), Skypel™ (SK Chemical), Keyflex BT™ (LG Chemical), urethane-based thermoplastic elastomers (TPE-U) (for example Skythane™ or Estane™), cross-linked olefin-based thermoplastic elastomers (TPE-V) (for example Sarlink™ (DSM)) and styrene block copolymers (TPE-S) (for example Multiflex™ (Multibase)), particularly preferably Arnitel™ (DSM), Skypel™ (SK Chemical), Keyflex BT™ (LG Chemical), Skythane™, Estane™, or Sarlink™ (DSM)). Alternatively, materials familiar to the person skilled in the art with similar physical-chemical properties may also be used or, for example, those based on natural rubber.

The further elements of the adjusting device according to the invention are manufactured from materials which are familiar to the person skilled in the art and conventional in vehicle construction.

Within the meaning of the invention, seat benches or the like are also conceivable as the vehicle seat, as well as individual seats.

The exemplary embodiments of the invention are described in more detail with reference to the accompanying schematic figures, in which:

FIG. 1 shows schematically an adjusting device for a vehicle seat comprising a carrier rail and a guide element arranged thereon by a positive connection, in which a lever element is inserted, FIG. 2 shows schematically a perspective view of the guide element with a profiled chamfer, and FIG. 3 shows schematically a longitudinal section through the guide element according to FIG. 2.

Parts which correspond to one another are provided with the same reference numerals in all the figures.

In FIG. 1 a detail of an adjusting device, in particular of a longitudinal adjusting mechanism for a vehicle seat, not shown in more detail, is shown in modular construction. The adjusting device comprises a carrier rail 1 and a lever element 2 which serve for the adjustment of the vehicle seat. To this end, the lever element 2 is rotatably arranged about a rotational axis on the carrier rail 1. The lever element 2 may be a lever arm, a rail or one such component.

Said lever element has on at least one end a guide element 3 for guiding the lever element 2. In this case, the guide element 3 is arranged at the end of the lever element 2 on which the rotational axis of the lever element 2 is formed.

The lever element 2 extends parallel to the carrier rail 1 and at the front is inserted into an opening of the guide element 3 and held there by a positive, non-positive and/or material connection.

The carrier rail 1 also has a recess 6 into which a connecting element 7 of a locking unit for the adjusting mechanism, not shown in more detail, protrudes. By actuating the lever element 2, in particular by rotating said lever element counter to the spring force of a spring element 8 holding the lever element 2, the guide element 3 rotates therewith, whereby the connecting element 7 moves and the locking of the longitudinal adjustment is released. An adjustment of the vehicle seat is now possible.

By releasing the lever element 2, said lever element together with the guide element 3 and the connecting element 7, are moved back again into their initial position due to the spring force of the spring element 8, so that the adjusting mechanism is locked again. To this end, the spring element 8 is preferably designed as a restoring spring.

Moreover, the actuation of the lever element 2 and, resulting therefrom, the movement of the guide element due to friction, in particular sliding friction of the guide element 3 on the carrier rail 1, may result in noise development which is undesirable.

At least for reducing such noise development, the guide element 3 is provided with a profiled chamfer 4 on a side facing the carrier rail 1. In the exemplary embodiment, the profiled chamfer 4 is provided with a profile configured as a wave-shaped profile 5, in order to reduce the bearing surface B of the contact region K between the guide element and the carrier rail 1. The chamfer 4 may also be provided with a different profile which reduces the bearing surface B of the contact region K.

In an advantageous development of the invention, the guide element 3 is manufactured from a material or materials or coated with such a material or materials which belong to the group of thermoplastic elastomers, in particular those which are selected from the group consisting of copolyester elastomers (COPE) (for example Arnitel™ (DSM), Skypel™ (SK Chemical), Keyflex BT™ (LG Chemical), urethane-based thermoplastic elastomers (TPE-U), (for example Skythane™ or Estane™), cross-linked olefin-based thermoplastic elastomers (TPE-V) (for example Sarlink™ (DSM)) and styrene block copolymers (TPE-S) (for example Multi-flex™ (Multibase)), particularly preferably Arnitel™ (DSM), Skypel™ (SK Chemical), Keyflex BT™ (LG Chemical), Skythane™, Estane™, or Sarlink™ (DSM)). Alternatively, materials familiar to the person skilled in the art with similar physical-chemical properties may also be used or, for example, those based on natural rubber.

LIST OF REFERENCE NUMERALS

1 Carrier rail
2 Lever element
3 Guide element
4 Profiled chamfer
5 Wave-shaped profile
6 Recesses
7 Connecting element
8 Spring element
B bearing surface
K contact region

The invention claimed is:

1. An adjusting device for a vehicle seat, comprising:
a lever element; and
a guide element adapted to guide and hold the lever element such that the lever element and the guide element rotate congruently,
wherein the guide element has at least one contact region formed on a side of the guide element facing a carrier rail, wherein the carrier rail has a longitudinal axis extending in a longitudinal direction,
wherein the at least one contact region has a bearing surface extending in the longitudinal direction and configured to contact the carrier rail,
wherein the at least one contact region at least partially comprises a profiled chamfer extending from the bearing surface in a lateral direction away from the carrier rail,
wherein the profiled chamfer has a chamfer surface that extends to and abuts the bearing surface so as to define a shared edge between the chamfer surface and the bearing surface, wherein the chamfer surface has undulations extending to the shared edge between the chamfer surface and the bearing surface such that the bearing surface at the shared edge has a wave-shaped portion along the longitudinal direction
wherein the guide element has a recess extending entirely through the guide element, wherein the chamfer surface forms a side wall of the recess.

2. The adjusting device as claimed in claim 1, wherein the guide element is manufactured from a thermoplastic elastomer selected from the group consisting of copolyester elastomers, urethane-based thermoplastic elastomers, cross-linked olefin-based thermoplastic elastomers and styrene block copolymers.

3. The adjusting device as claimed in claim 1, wherein the guide element is manufactured from at least one material that is a thermoplastic elastomer or a natural rubber, wherein the thermoplastic elastomer is a copolyester elastomer, a urethane-based thermoplastic elastomer, or an olefin-based thermoplastic elastomer.

4. A vehicle seat comprising the adjusting device as claimed in claim 1 for the longitudinal adjustment thereof.

* * * * *

UNITED STATES PATENT AND TRADEMARK OFFICE
CERTIFICATE OF CORRECTION

| | | |
|---|---|---|
| PATENT NO. | : 9,290,110 B2 | Page 1 of 1 |
| APPLICATION NO. | : 13/818974 | |
| DATED | : March 22, 2016 | |
| INVENTOR(S) | : Andreas Niehues et al. | |

It is certified that error appears in the above-identified patent and that said Letters Patent is hereby corrected as shown below:

ON THE TITLE PAGE

On the second page of the patent under "OTHER PUBLICATIONS" please replace the second non-patent reference as follows:

-- Office Action received in Japanese Application No. 2013-522271 dated February 25, 2014 (with Translation) --.

Signed and Sealed this
Thirty-first Day of May, 2016

Michelle K. Lee
*Director of the United States Patent and Trademark Office*